(12) United States Patent
Jung et al.

(10) Patent No.: US 11,349,112 B2
(45) Date of Patent: May 31, 2022

(54) METHOD FOR PREPARING HOLLOW STRUCTURE

(71) Applicant: LG CHEM, LTD., Seoul (KR)

(72) Inventors: Jongwook Jung, Daejeon (KR); Se Ho Park, Daejeon (KR); Minchul Jang, Daejeon (KR); Gyo Hyun Hwang, Daejeon (KR); Eunkyung Park, Daejeon (KR); Changhun Park, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 574 days.

(21) Appl. No.: 16/469,040

(22) PCT Filed: Aug. 28, 2018

(86) PCT No.: PCT/KR2018/009896
§ 371 (c)(1),
(2) Date: Jun. 12, 2019

(87) PCT Pub. No.: WO2019/045404
PCT Pub. Date: Mar. 7, 2019

(65) Prior Publication Data
US 2020/0099040 A1    Mar. 26, 2020

(30) Foreign Application Priority Data
Aug. 31, 2017    (KR) .................. 10-2017-0111311

(51) Int. Cl.
*H01M 4/04*     (2006.01)
*B22F 9/24*     (2006.01)
(Continued)

(52) U.S. Cl.
CPC ............. *H01M 4/0471* (2013.01); *B22F 1/16* (2022.01); *B22F 9/24* (2013.01); *H01M 4/1395* (2013.01);
(Continued)

(58) Field of Classification Search
CPC ................................ H01M 4/0471; B22F 9/24
See application file for complete search history.

(56) References Cited

U.S. PATENT DOCUMENTS

2006/0228550 A1* 10/2006 Ou ........................... C08F 8/42
                                                              524/403
2009/0136816 A1    5/2009 Kang et al.
(Continued)

FOREIGN PATENT DOCUMENTS

| CN | 101323444 A | 12/2008 |
|---|---|---|
| CN | 101444710 A | 6/2009 |

(Continued)

OTHER PUBLICATIONS

Dai, et al., "Preparation of hollow carbon spheres by carbonization of polystyrene/polyaniline core-shelf polymer particles", New Carbon Materials, vol. 26, Issue 5, Aug. 2011, pp. 389-395.

(Continued)

*Primary Examiner* — Khanh T Nguyen
(74) *Attorney, Agent, or Firm* — Birch, Stewart, Kolasch & Birch, LLP (57) ABSTRACT

A method for preparing a hollow structure, and more particularly, to a method for preparing a hollow structure having various stable structures by using polystyrene particles, into which a functional group is introduced, as a template for preparing the hollow structure.

14 Claims, 5 Drawing Sheets

(51) Int. Cl.
*H01M 4/1395* (2010.01)
*H01M 4/36* (2006.01)
*H01M 4/38* (2006.01)
*H01M 4/62* (2006.01)
*H01M 10/0525* (2010.01)
*B22F 1/16* (2022.01)
*H01M 4/02* (2006.01)

(52) U.S. Cl.
CPC ............ *H01M 4/366* (2013.01); *H01M 4/38* (2013.01); *H01M 4/382* (2013.01); *H01M 4/625* (2013.01); *H01M 10/0525* (2013.01); *B22F 2301/255* (2013.01); *B22F 2302/40* (2013.01); *H01M 2004/021* (2013.01); *H01M 2004/027* (2013.01)

(56) References Cited

U.S. PATENT DOCUMENTS

| | | |
|---|---|---|
| 2011/0123456 A1 | 5/2011 | Pandit et al. |
| 2011/0165465 A1 | 7/2011 | Kim et al. |
| 2011/0174368 A1 | 7/2011 | Lee et al. |
| 2017/0279124 A1 | 9/2017 | Kim et al. |
| 2017/0305082 A1 | 10/2017 | Kim et al. |

FOREIGN PATENT DOCUMENTS

| | | | |
|---|---|---|---|
| CN | 102167309 A | 8/2011 | |
| CN | 102716702 A | 10/2012 | |
| CN | 106794990 A | 5/2017 | |
| KR | 10-2005-0050298 A | 5/2005 | |
| KR | 10-2009-0060855 A | 6/2009 | |
| KR | 10-1155909 B1 | 6/2012 | |
| KR | 20160001122 A * | 1/2016 | ............ C08F 2/18 |
| KR | 10-2016-0022156 A | 2/2016 | |
| KR | 10-2016-0038835 A | 4/2016 | |
| KR | 10-1611744 B1 | 4/2016 | |
| KR | 10-1672532 B1 | 11/2016 | |

OTHER PUBLICATIONS

International Search Report (PCT/ISA/210) issued in PCT/KR2018/009896, dated Jan. 9, 2019.

Yan, et al., "Selective deposition and stable encapsulation of lithium through heterogeneous seeded growth", Nature Energy, 2016, vol. 1, Article No. 16010, pp. 1-8.

Yang, et al., "Uniform hollow conductive polymer microspheres synthesized with the sulfonated polystyrene template", Materials Chemistry and Physics, 2005, vol. 92, pp. 164-171.

European Search Report for Appl. No. 18850479.9 dated Aug. 9, 2019.

Gorsd, M.N., et al, "Synthesis of polystyrene microspheres to be used as template in the preparation of hollow spherical materials: study of the operative variables," Procedia Materials Science, Jan. 1, 2012, vol. 1, pp. 432-438.

Li, N., et al, "Sol-gel coating of inorganic nanostructures with resorcinol-formaldehyde resin," Chem. Commun., Mar. 13, 2013, vol. 49, No. 45, pp. 5135-5137.

Wang, P.H., et al, Preparation of styrene/acrylic add copolymer microspheres: polymerization mechanism and carboxyl group distribution,* Colloid Polym Sci, Feb. 1, 2002, vol. 280, No. 2, pp. 152-159.

Chai, G.S., et al, "Synthesis of Ordered, Uniform, Macroporous Carbons with Mesoporous Walls Templated by Aggregates of Polystyrene Spheres and Silica Particles for Use as Catalyst Supports in Direct Methanol Fuel Cells," Advanced Materials, Nov. 2004, vol. 16, Issue 22, pp. 2057-2061.

* cited by examiner

[Figure 1]

Comparative Preparation Example 1-1

Comparative Preparation Example 1-2

Comparative Preparation Example 1-3

[Figure 2]

Preparation Example 1-1

Preparation Example 1-2

Preparation Example 1-3

METHOD FOR PREPARING HOLLOW STRUCTURE

TECHNICAL FIELD

This application claims the benefit of priority based on Korean Patent Application No. 10-2017-0111311, filed on Aug. 31, 2017, the entire contents of which are incorporated herein by reference.

The present invention relates to a method of preparing hollow structures capable of efficiently preparing hollow structures having various structures.

BACKGROUND ART

Recently, with the development in the electronic industry, it has become possible to miniaturize and lighten the electronic device, and thus the use of portable electronic devices is increasing. The need for a secondary battery having a high energy density as a power source for such portable electronic devices has been increased, and thus studies on a lithium secondary battery have been actively conducted. Along with this, the lithium ion battery, which is used as a battery for electric vehicles, has been adopted in short-distance driving vehicles due to its physical limit (maximum energy density of ~250 Wh/kg).

Since lithium metal has a theoretical capacity of 3,862 mAh/g and a low standard electrode potential (~3.04 vs SHE), it is an ideal material for the negative electrode of the lithium secondary battery with high energy density. However, lithium metal has not been commercialized as a material of the negative electrode for the lithium battery because of the safety problem due to the internal short circuit of the battery by the growth of lithium dendrite. In addition, lithium metal can cause a side reaction with an active material or electrolyte, which can greatly affect the short circuit and life of the battery. Therefore, the technology for the stabilization of the lithium metal electrode and the suppression of the dendrite is a key technology that must be preceded for the development of next generation lithium secondary battery.

Various types of electrode active materials have been studied in order to inhibit the growth of lithium metal dendrite and to prevent the reaction of lithium metal and electrolyte solution as described above, and in recent years, interest in the hollow structures has been increased.

For example, a negative electrode active material in the form of a hollow structure in which Au is deposited on the inner surface of the hollow capsule and lithium metal is filled in the hollow capsule using the Au as a seed has been developed (Nature Energy 1, Article number: 16010 (2016), "Selective deposition and stable encapsulation of lithium through heterogeneous seeded growth"). In the case of the negative electrode active material in the form of the hollow capsule, it is possible to ensure stability in the electrolyte solution due to the closed shape, but there are problems that it is not easy to control the volume of the lithium metal filled in the hollow capsule and the conductivity of the electrode may be deteriorated due to the spherical shape.

Accordingly, it is urgent to develop a technology capable of efficiently and mass-producing hollow structures having various and stable shapes.

PRIOR ART LITERATURE

Patent Literature (Patent Literature 1) Korean Patent No. 1155909, NEGATIVE ACTIVE MATERIAL FOR RECHARGEABLE LITHIUM BATTERY, METHOD OF PREPARING SAME, AND RECHARGEABLE LITHIUM BATTERY INCLUDING SAME.

Non-Patent Literature (Non-Patent Literature 1) Nature Energy 1, Article number: 16010 (2016), "Selective deposition and stable encapsulation of lithium through heterogeneous seeded growth."

DISCLOSURE

Technical Problem

In order to solve the above problems, the inventors of the present invention have conducted various studies, and as a result, by using functional group-introduced polystyrene particles as a template in preparing the hollow structures, they have prepared hollow structures containing metal on its inner surface by replacing the functional group with the metal, coating with carbon-based polymer and then carbonizing to remove polystyrene, and they have confirmed that the hollow structures thus produced has a variety of stable structures and can be mass-produced.

Therefore, it is an object of the present invention to provide a method for preparing hollow structures having various stable structures by using polystyrene particles having various functional groups introduced on its surface as a template.

Technical Solution

In order to achieve the above object, the present invention provides a method of making a hollow structure comprising the steps of: (S1) preparing polystyrene having one or more functional group by a method including reacting a styrene monomer, a monomer for introducing the functional group and an initiator; (S2) adding the polystyrene of step (S1) to a metal solution to form polystyrene into which metal is introduced; (S3) coating the metal-introduced polystyrene with a carbon-based polymer; (S4) performing a first heat treatment on the metal-introduced polystyrene, which was coated with the carbon-based polymer, to remove the polystyrene; and (S5) performing a second heat treatment on the result of step (S4) to carbonize the result of step (S4).

The functional group may be at least one selected from the group consisting of a carboxyl group (—COOH), a hydroxy group (—OH) and an amine group (—NH$_2$).

The monomer for introducing the functional group may be at least one selected from the group consisting of acrylic acid, 2-hydroxyethyl acrylate and allyl amine.

The initiator may be at least one selected from the group consisting of 4,4'-azobis(4-cyanovaleric acid), 2,2'-azobis(2-methylpropionamidine) dihydrochloride and potassium persulfate.

It is possible to perform the polymerization by reacting 60 to 95% by weight of the styrene monomer; 1 to 30% by weight of a monomer for introducing the functional group; and 1 to 10% by weight of initiator.

The metal solution is prepared by dissolving a metal precursor in a solvent, and the metal precursor may have a concentration of 0.05 to 3 M.

The metal precursor may be at least one selected from the group consisting of alkoxide containing metal, acetyl acetate containing metal, nitrate containing metal, oxalate containing metal, halide containing metal and cyanide containing metal.

The metal may be at least one selected from the group consisting of Au, Zn, Mg, Ag, Al, Pt, Si and Ca.

The solvent may be at least one selected from the group consisting of ethanol, 1-propanol, iso-propanol, DI-water, NMP (methylpyrrolidone), DMF (dimethylformamide), DMAc (dimethylacetamide), DMSO (dimethyl sulfoxide) and THF (tetrahydrofuran).

The carbon-based polymer may be at least one selected from the group consisting of resorcinol, polyacrylonitrile (PAN), polyaniline (PANI), polypyrrole (PPY), polyimide (PI), polybenzimidazole (PBI), polypyrrolidone (Ppy), polyamide (PA), polyamide-imide (PAI), polyaramide, melamine, melamine-formaldehyde and fluorine mica.

A temperature for the first heat treatment may be 450 to 600° C.

The first heat treatment may be conducted under an inert atmosphere for 30 minutes to 3 hours.

The inert atmosphere may be formed by the inert gas selected from the group consisting of nitrogen, argon, helium, neon, krypton, xenon and radon.

A temperature for the second heat treatment may be 900 to 1200° C.

The inert atmosphere may include an inert gas selected from the group consisting of nitrogen, argon, helium, neon, krypton, xenon and radon.

Advantageous Effects

According to the method for preparing the hollow structure of the present invention, since the polystyrene particle containing at least one functional group selected from the group consisting of a carboxyl group, an amine group and a hydroxy group are used as a template for preparing the hollow structure, the carbon-based polymer forming the shell of the hollow structure is chemically bonded to the functional group, and thus the formation of the shell to be prepared becomes dense, and accordingly, the hollow structure can have a stable structure.

In addition, the functional group can be replaced with metal by a simple process of immersing the functional group-introduced polystyrene particle in a metal solution, and thus mass production is possible.

In addition, since the polystyrene particle is completely removed by carbonization, when the electrode active material is supported on the hollow structure, the resistance of the electrode active material can be reduced.

BEST MODE

Hereinafter, the present invention will be described in detail in order to facilitate understanding of the present invention.

The terms and words used in the present specification and claims should not be construed as limited to ordinary or dictionary meanings, and should be construed in a sense and concept consistent with the technical idea of the present invention, based on the principle that the inventor can properly define the concept of a term to describe his invention in the best way.

Method for Preparing Hollow Structure

The present invention relates to a method for preparing a hollow structure, which can introduce a functional group on the surface of the polystyrene particles to increase the reactivity of the polystyrene particles, thereby allowing the functional group to be substituted with various metals, and as a result, can produce a hollow structure in which various metals are stably contained on its inner surface.

The hollow structures having various stable structures thus prepared can be used for supporting an electrode active material, thereby improving the stability of the battery.

The present invention provides a method of making a hollow structure comprising the steps of: (S1) polymerizing polystyrene having one or more complex functional groups introduced by reacting a styrene monomer, a monomer for introducing the functional group and an initiator; (S2) adding polystyrene to a metal solution to form polystyrene into which metal was introduced; (S3) coating the metal-introduced polystyrene with a carbon-based polymer; (S4) performing the first heat treatment on the metal-introduced polystyrene, which was coated with the carbon-based polymer, to remove the polystyrene; and (S5) performing the second heat treatment on the result of step (S4) to carbonize it.

Hereinafter, the method of preparing a hollow structure according to the present invention will be described in more detail for each step.

Step (S1)

In step (S1), one or two or more functional group-introduced polystyrenes can be polymerized by reacting the styrene monomer, the monomer for introducing the functional group and the initiator.

Specifically, after the temperature of the initiator solution is elevated, the styrene monomer and the monomer for introducing the functional group may be added and reacted to polymerize the functional group-introduced polystyrenes.

At this time, the initiator solution may be an aqueous initiator solution, and the elevated temperature may be 70 to 90° C., preferably 73 to 88° C., more preferably 75 to 85° C. If the elevated temperature is less than the above range, the polymerization reaction may not occur. If the elevated temperature is more than the above range, the properties of the reactants, that is, initiator, styrene monomer and monomer for introducing the functional group may be denatured.

In the present invention, the styrene monomer is an essential monomer for polymerizing polystyrenes.

In the present invention, the initiator is a substance required to induce polystyrene polymerization through the introduction of radicals, and the initiator used in the present invention may be at least one selected from the group consisting of 4,4'-azobis(4-cyanovaleric acid), 2,2'-azobis (2-methylpropionamidine) dihydrochloride and potassium persulfate.

In addition, the initiator may introduce a functional group to the surface of polystyrene, and one functional group selected from carboxyl group (—COOH), amine group (—NH$_2$) and sulfate group (—SO$_4$) depending on the kind of the initiator may be introduced on the surface of the polystyrene.

As described above, Au particles with a high reactivity can be loaded well by one functional group formed on the surface of polystyrene particles with the initiator, but the coating property of the carbon material may be deteriorated depending on the reactivity with the surface of the polystyrene particle, and thus the stability of the shell of the hollow structure may be deteriorated.

Therefore, it is necessary to modify the surface of polystyrene particles so as to have good reactivity with metal as well as even with the carbon material forming the shell of the hollow structure, and thus it is possible to introduce one or more functional group onto the surface of the polystyrene by using the monomer for introducing the functional group.

In the present invention, the monomer for introducing the functional group is a monomer for surface modification by introducing a functional group onto the surface of the polystyrene particle, and can play a role in controlling physical properties such as the size of the polystyrene particle to be polymerized. It may be advantageous to have a property of being more hydrophilic than the styrene monomer in order to stably introduce a functional group onto the surface of the polystyrene particle. Specifically, the monomer for introducing the functional group is hydrophilic compared to styrene, and thus is mainly present on the surface of the polystyrene particle synthesized in the water-based reaction, and accordingly the functional group can be introduced onto the surface of the polystyrene particle.

For example, the monomer for introducing the functional group may be at least one selected from the group consisting of acrylic acid, 2-hydroxyethyl acrylate and allyl amine. When these monomers for introducing the functional group are used, carboxyl group (—COOH), hydroxy group (—OH) and amine group (—NH$_2$) can be introduced onto the surface of the polystyrene particle, respectively. When used together with the initiator, the surface of the polystyrene particle may be modified by forming at least one functional group on the surface of the polystyrene particle so that the carbon material is loaded well with the metal.

When the carboxyl group (—COOH) among the functional groups is introduced, it may be advantageous in terms of reactivity of the polystyrene particle. Accordingly, it may be advantageous to use acrylic acid as the monomer for introducing the functional group.

In the present invention, the initiator is a substance required to induce polystyrene polymerization through the introduction of radicals, and the initiator used in the present invention may be at least one selected from the group consisting of 4,4'-azobis(4-cyanovaleric acid), 2,2'-azobis (2-methylpropionamidine) dihydrochloride and potassium persulfate.

In the present invention, it is possible to perform the polymerization by reacting 60 to 95% by weight of the styrene monomer; 1 to 30% by weight of a monomer for introducing the functional group; and 1 to 10% by weight of initiator.

The styrene monomer may be used in an amount of 60 to 95% by weight, preferably 70 to 85% by weight, more preferably 70 to 80% by weight. If the amount of the styrene monomer is less than the above range, the polystyrene particles themselves may not be formed. If the amount of styrene monomer is more than the above range, the amount of the monomer for introducing the functional group and the initiator is relatively decreased and thus it may be difficult to introduce the functional group.

The monomer for introducing the functional group may be 1 to 30% by weight, preferably 3 to 20% by weight, and more preferably 3 to 15% by weight. If the amount of the monomer for introducing the functional group is less than the above range, it may be difficult to introduce a functional group onto the surface of the polystyrene particle. If the amount exceeds the above range, there may be no substantial benefit by the addition of the weight for the monomer for introducing the functional group. In the present invention, the size of the polystyrene particles can be controlled depending on the addition ratio of the monomer for introducing the functional group. Accordingly, the size of the polystyrene particles can be controlled by controlling the addition amount of the monomer for introducing the functional group within the above range, and as a result, the size of the hollow formed in the hollow structure can be controlled.

The initiator may be used in an amount of 1 to 10% by weight, preferably 1 to 8% by weight, more preferably 1 to 5% by weight. If the amount is less than the above range, the polymerization reaction of polystyrene may not be proceeded. If the amount exceeds the above range, the polystyrene formed by polymerization may be affected and thus the durability of the polystyrene may be lowered.

A functional group-introduced polystyrene particle can be obtained by the process of step (S1) as described above.

Step (S2) In step (S2), the polystyrene may be added to the metal solution or the metal particle solution to form the polystyrene into which metal was introduced.

In the present invention, the metal solution may be one prepared by dissolving a metal precursor in a solvent, and the concentration of the metal solution may be 0.05 to 3 M, preferably 0.08 to 2 M, more preferably 1 to 1.5 M. If the concentration of the metal solution is less than the above range, it may be difficult to sufficiently replace the functional group on the surface of the polystyrene particles with the metal. If the concentration exceeds the above range, the reaction of substituting the functional group with the metal may be rather slowly proceeded.

The metal may be formed on the inner surface of the hollow structure to serve as a seed metal for the growth of the electrode active material. For example, the metal is preferably a metal capable of forming an alloy with the electrode active material and may be at least one selected from the group consisting of Au, Zn, Mg, Ag, Al, Pt, Si and Ca, and more preferably Au.

The metal precursor may be at least one selected from the group consisting of alkoxide, acetyl acetate, nitrate, oxalate, halide and cyanide of the metal, and it may be advantageous to use the halide of the metal in terms of reactivity, In addition, the solvent may be at least one selected from the group consisting of ethanol, 1-propanol, iso-propanol, DI-water, NMP (methylpyrrolidone), DMF (dimethylformamide), DMAc (dimethylacetamide), DMSO (dimethyl sulfoxide) and THF (tetrahydrofuran), and it may be advantageous to use DI-water in terms of solubility of the metal precursor.

By the process of step (S2) as described above, even though the polystyrene into which the functional group was introduced is immersed in a metal solution and a metal particle solution, the polystyrene particles into which the metal was introduced can be obtained without a separate coating process.

Meanwhile, the time for immersing in the metal solution and reacting may be from 5 minutes to 16 hours depending on the type of the functional group of the polystyrene particle into which the functional group was introduced. If the time for the reaction is less than the above range, there is not enough time for the metal to be introduced into the surface of the polystyrene particles. If the time for the reaction exceeds the above range, the substitution probability of the functional group by the metal may be reduced. Preferably, the time for the reaction may be 5 minutes to 10 hours, and more preferably 5 minutes to 5 hours.

The functional groups introduced on the surface of the polystyrene particles may differ in their reactivity with the metal particles depending on their types. For example, the amine group among the functional groups is highly reactive with Au particles, and thus the reaction is proceeded immediately upon mixing the two components. The carboxyl group is not as reactive as the amine group and thus the reaction can be proceeded overnight.

Step (S3)

In step (S3), the metal-introduced polystyrene may be coated with a carbon-based polymer.

The carbon-based polymer may be a raw material for forming a shell of the hollow structure. By using carbon-based polymer, it may be advantageous in terms of durability, electrical conductivity and lithium ionic conductivity of the hollow structure.

If the electrode active material to be supported on the hollow structure is lithium, lithium is grown on the surface of the shell made of carbon, wherein since the metal such as Au is formed on the surface of the shell, the Au acts as a seed metal serving as a catalyst for the growth of lithium, thereby promoting the growth of lithium and thus preventing the growth of lithium dendrite due to the morphological characteristics of the hollow structure.

Specifically, the carbon-based polymer solution can be prepared and coated, and the carbon-based polymer solution may be prepared by mixing 5 to 25% by weight of a carbon-based polymer and 75 to 95% by weight of a solvent.

If the amount of the carbon-based polymer is less than the above range, the durability of the formed hollow structure may be deteriorated. If the amount exceeds the above range, the coating property may not be good and carbon particles that are formed as a by-product without coating can be formed. The carbon-based polymer may be used in an amount of preferably 5 to 20% by weight, more preferably 5 to 15% by weight.

If the amount of the solvent is less than the above range, the concentration of the solution may be high and the coating property may not be good. If the amount exceeds the above range, the solution may be excessively diluted and the durability of the hollow structure produced may be lowered. In addition, the solvent may be used in an amount of preferably 80 to 90% by weight, more preferably 82 to 88% by weight.

The carbon-based polymer may be at least one selected from the group consisting of resorcinol, polyacrylonitrile (PAN), polyaniline (PANI), polypyrrole (PPY), polyimide (PI), polybenzimidazole (PBI), polypyrrolidone (Ppy), polyamide (PA), polyamide-imide (PAI), polyaramide, melamine, melamine-formaldehyde and fluorine mica. However, resorcinol may be preferred in terms of durability, electrical conductivity and lithium ionic conductivity after carbonization.

The solvent may be at least one selected from the group consisting of ethanol, 1-propanol, iso-propanol, DI-water, NMP (methylpyrrolidone), DMF (dimethylformamide), DMAc (dimethylacetamide), DMSO (dimethyl sulfoxide), THF (tetrahydrofuran) and a combination thereof.

By the process of step (S3) as described above, a hollow structure precursor obtained by coating the metal-introduced polystyrene with a carbon-based polymer may be produced.

Step (S4)

In step (S4), the first heat treatment is performed on the metal-introduced polystyrene which was coated with the carbon-based polymer, and thus the metal precursor can be reduced to metal while the polystyrene is removed.

In the present invention, the temperature for the first heat treatment may be 450 to 600° C., preferably 480 to 600° C., more preferably 500 to 600° C., and it is possible to perform the heat treatment while raising the temperature. If the temperature for the first heat treatment is less than the above range, the polystyrene may not be removed and the metal precursor may not be reduced. Since both the removal of polystyrene and the reduction of the metal precursor can occur within the above range, if the temperature for the first heat treatment exceeds the above range, there is a problem that metal is formed not only on the inner surface of the shell but also on the outer surface of the shell.

In addition, the first heat treatment may be conducted under an inert atmosphere for 30 minutes to 3 hours, preferably 1 to 2 hours and more preferably 1 hour and 30 minutes to 2 hours.

If the time for the first heat treatment is less than the above range, the polystyrene is not completely removed and thus the resistance of the electrode active material may be increased when supporting the electrode active material on the hollow structure to be prepared. If the time for the first heat treatment exceeds the above range, the polystyrene can be completely removed, but the physical properties of the hollow structure may be deteriorated.

At this time, the inert atmosphere may be formed by the inert gas selected from the group consisting of nitrogen, argon, helium, neon, krypton, xenon and radon. Preferably, the inert gas may be argon.

Step (S5)

In step (S5), the result of step (S4) may be carbonized by the second heat treatment.

In the present invention, the temperature for the second heat treatment may be 900 to 1200° C., preferably 900 to 1100° C., and more preferably 900 to 1000° C. If the temperature for the second heat treatment is less than the above range, carbonization may not be completely performed. If the temperature for the second heat treatment exceeds the above range, the physical properties of the formed hollow structure may be deteriorated due to the high temperature heat treatment.

The hollow structure prepared through steps (S1) to (S5) as described above can have various metals formed on the inner surface of the shell, and thus it is possible to prepare hollow structures having various stable structures.

In addition, according to the above-described method for producing the hollow structure, the hollow structures can be synthesized in large quantities, which is advantageous for commercialization.

In addition, since the template of polystyrene used in preparing the hollow structure can be completely removed by the heat treatment process, when the electrode active material is supported on the hollow structure, the resistance of the electrode active material can be reduced.

In addition, when applying to the electrode while supporting the electrode active material on the hollow structure, it possible to prevent the electrode: active material from growing dendritically and to prevent contact between the electrode active material and the electrolyte solution to enhance the safety of the battery.

Hereinafter, preferred examples of the present invention will be described in order to facilitate understanding of the present invention. It will be apparent to those skilled in the art, however, that the following examples are illustrative of the present invention and that various changes and modifications can be made within the scope and spirit of the present invention. Such changes and modifications are intended to fall within the scope of the appended claims.

Comparative Preparation Examples 1-1 to 1-3: Synthesis of Polystyrene Particles Depending on the Type of Initiator

Comparative Preparation Example 1-1

As shown in Table 1 below, polystyrene templates were prepared using styrene as a monomer and an initiator.

After dissolving 1 g of 4,4'-azobis(4-cyanovaleric acid) as an initiator in 500 ml of DI-water, the temperature was raised to 80° C. and then 30 g of styrene as a monomer was added dropwise and reacted overnight to prepare polystyrene (PS) templates having carboxyl group (—COOH) introduced therein.

TABLE 1

|  | Comparative Preparation Example 1-1 | Comparative Preparation Example 1-2 | Comparative Preparation Example 1-3 |
| --- | --- | --- | --- |
| Monomer | Styrene | Styrene | Styrene |
| Initiator | 4,4'-azobis(4-cyanovaleric acid) | 2,2'-azobis(2-methylpropionamidine) dihydrochloride | Potassium persulfate |
| Functional group | —COOH | —NH$_2$ | —SO$_4$ |

Comparative Preparation Example 1-2

Polystyrene (PS) templates having amine group (—NH$_2$) introduced therein were prepared in the same manner as in Comparative Preparation Example 1-1 except that 2,2'-azobis(2-methylpropionamidine) dihydrochloride was used as an initiator.

Comparative Preparation Example 1-3

Polystyrene (PS) templates having sulfate group (—SO$_4$) introduced therein were prepared in the same manner as in Comparative Preparation Example 1-1 except that potassium persulfate was used as an initiator.

Preparation Examples 1-1 to 1-3: Synthesis of Functional Group-Introduced Polystyrene Particles Depending on the Type of Monomer for Introducing the Functional Group

Preparation Example 1-1

As shown in the following Table 2, polystyrene templates having hydroxy group (—OH) and carboxyl group (—COOH) introduced therein were prepared by using styrene as a monomer, 2-hydroxyethyl acrylate as a functional group-introducing monomer for introducing the carboxyl group, and 2,2'-azobis(2-methylpropionamidine) dihydrochloride as an initiator.

After dissolving 1 g of 2,2'-azobis(2-methylpropionamidine) dihydrochloride as an initiator in 500 ml of DI-water, the temperature was raised to 80° C. and then g of styrene as a monomer and 8 g of 2-hydroxyethyl acrylate as a monomer for introducing the functional group were added dropwise and reacted overnight to prepare a polystyrene (PS) template having hydroxy group (—OH) and amine group (NH$_2$) introduced therein.

TABLE 2

|  | Preparation Example 1-1 | Preparation Example 1-2 | Preparation Example 1-3 |
| --- | --- | --- | --- |
| Monomer | Styrene | Styrene | Styrene |
| Monomer for introducing the functional group | 2-hydroxyethyl acrylate | Acrylic acid | Allyl amine |
| Initiator | 2,2'-azobis(2-methylpropionamidine) dihydrochloride | 2,2'-azobis(2-methylpropionamidine) dihydrochloride | 2,2'-azobis(2-methylpropionamidine) dihydrochloride |
| Functional group | —OH, —NH$_2$ | —COOH, —NH$_2$ | —NH$_2$ |

Preparation Example 1-2

Polystyrene (PS) templates having carboxyl group (—COOH) and amine group (—NH$_2$) introduced therein were prepared in the same manner as in Preparation Example 1-1 except that an acrylic acid was used as a monomer for introducing the functional group.

Preparation Example 1-3

A polystyrene (PS) template having amine group (—NH$_2$) introduced therein was prepared in the same manner as in Preparation Example 1-1 except that an allyl amine was used as a monomer for introducing the functional group.

Preparation Examples 2-1 to 2-3: Synthesis of Functional Group-Introduced Polystyrene Particles Depending on the Content of Monomer for Introducing the Functional Group Polystyrene (PS) templates were prepared in the same manner as in Preparation Example 1-1 except that the amounts of styrene as a monomer, monomer for introducing the functional group and initiator used in the polymerization are changed as shown in Table 3 below.

TABLE 3

| | Preparation Example 2-1 | Preparation Example 2-2 | Preparation Example 2-3 |
|---|---|---|---|
| Styrene as a monomer | 87 wt. % | 94.5 wt. % | 95 wt. % |
| Monomer for introducing the functional group | 10 wt. % | 2.5 wt. % | — |
| Initiator | 3 wt. % | 3 wt. % | 5 wt. % |

Example 1: Preparation of Hollow Structure Using Functional Group-Introduced Polystyrene (1) Polystyrene Particle Polystyrene particles with carboxyl group (—COOH) and amine group (—NH 2) prepared in Preparation Example 1-2 were used as the templates.

(2) Substitution of Functional Group of Polystyrene by Metal Particle 0.97 g of sodium citrate was dissolved in 150 ml of DI-water and the temperature was raised to 100° C. Thereafter, 1 ml of a 0.1 M HAuCl$_4$ solution prepared by dissolving HAuCl$_4$ in DI-water was added, and after 5 minutes, the reaction was terminated to obtain an Au solution containing Au particles with a size of 10 to 20 nm.

The Au solution was added to the solution of the polystyrene particles over 1 hour to prepare Au introduced polystyrene particles (PS@Au).

(3) Coating with Carbon-Based Polymer 0.4 g of the polystyrene particles into which Au was introduced was dispersed in 300 ml of DI-water. Thereafter, 0.04 g of CTAB (cetyltrimethylammonium bromide) and 1.6 ml of NH$_4$OH were added and stirred for 30 minutes. 0.6 g of resorcinol and 0.84 ml of formaldehyde were added and stirred for 16 hours at room temperature. The Au-introduced polystyrene particles were coated with carbon-based polymer (PS@Au@C).

(4) Removal of Polystyrene

The polystyrene particles coated with the carbon-based polymer were washed three times with DI-water, dried at 70° C. for 5 hours, and then the temperature was raised at a rate of 1° C./min under an Ar atmosphere and performed the heat treatment at a heat treatment temperature of 600° C. to remove polystyrene particles.

(5) Carbonization

Thereafter, resorcinol was calcined at a heating temperature of 900° C. for 1 hour while heating at a heating rate of 10° C./min to produce a hollow structure having Au formed on its inner surface (Au@C).

Comparative Example 1: Preparation of Hollow Structure Using Polystyrene

Hollow structures having Au formed on its inner surface were prepared in the same manner as in Example 1 except that the polystyrene particles prepared in Comparative Preparation Example 1-2 instead of the polystyrene particles containing carboxyl group (—COOH) and amine group (—NH$_2$) prepared in Preparation Example 1-2 were used as the templates.

Experimental Example 1: Observation of Polystyrene Particles Depending on the Type of the Initiator and the Monomer for Introducing the Functional Group (1) Polystyrene particles of Comparative Preparation Examples 1-1 to 1-3 prepared by different initiators were observed.

Figure 1:
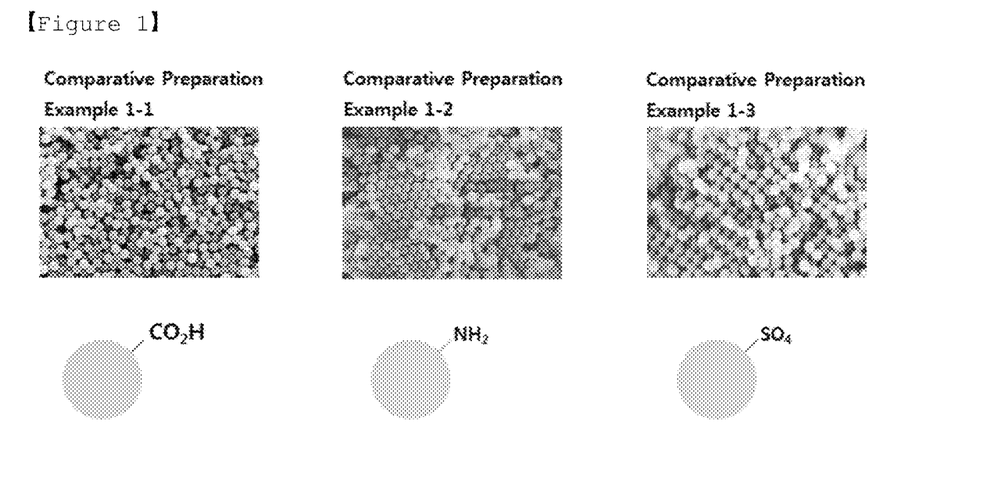
FIG. 1 shows SEM (scanning electron microscope) photographs and schematic diagrams of polystyrene particles prepared in Comparative Preparation Examples 1-1 to 1-3.

FIG. 1 shows SEM photographs and a schematic diagram of polystyrene particles prepared in Comparative Preparation Examples 1-1 to 1-3.

Referring to FIG. 1, it can be seen that the type of functional group introduced into polystyrene depends on the type of initiator.

(2) The polystyrene particles prepared in Preparation Examples 1-1 to 1-3 while varying the monomer for introducing the functional group were observed.

Figure 2:
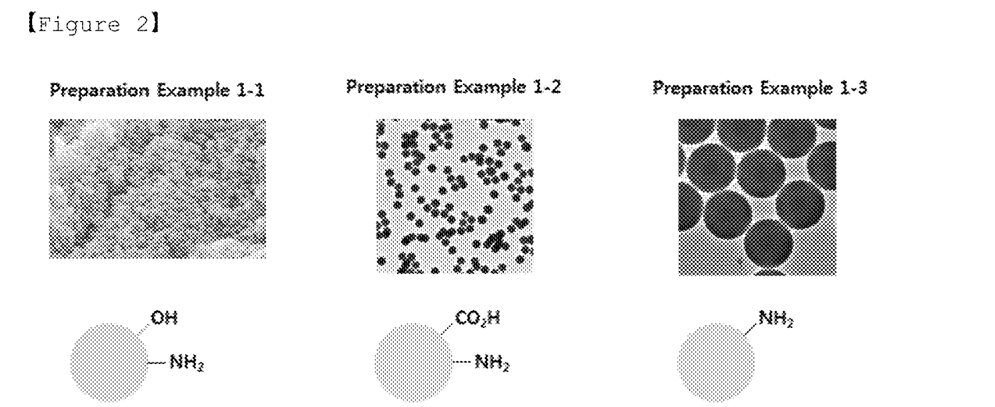
FIG. 2 shows SEM (scanning electron microscope) and TEM (transmission electron microscope) photographs and schematic diagrams of polystyrene particles prepared in Preparation Examples 1-1 to 1-3.

FIG. 2 shows SEM and TEM photographs and a schematic diagram of polystyrene particles prepared in Preparation Examples 1-1 to 1-3.

Referring to FIG. 2, it can be seen that the size of polystyrene particles and the type of the functional group introduced into polystyrene depend on the type of the monomer for introducing the functional group.

Experimental Example 2: Observation of the Introduction Form of Au Particles on the Surface of Polystyrene Particles Depending on the Presence or Absence of Functional Group of Polystyrene Particles 0.97 g of sodium citrate was dissolved in 150 ml of DI-water and the temperature was raised to 100° C. Thereafter, 1 ml of 0.1 M HAuCl$_4$ solution prepared by dissolving HAuCl$_4$ in DI-water was added, and after 5 minutes, the reaction was terminated to obtain an Au solution containing Au particles with a size of 10 to 20 nm.

The obtained Au solution was added to a solution of polystyrene (PS) having a carboxyl group (—COOH) prepared in Comparative Preparation Example 1-1 and a solution of polystyrene having an amine group (—NH 2) prepared in Comparative Preparation Example 1-2 respectively over 1 hour and then reacted for 16 hours and 1 hour, respectively, to prepare polystyrene particles containing Au introduced therein.

Figure 3A:
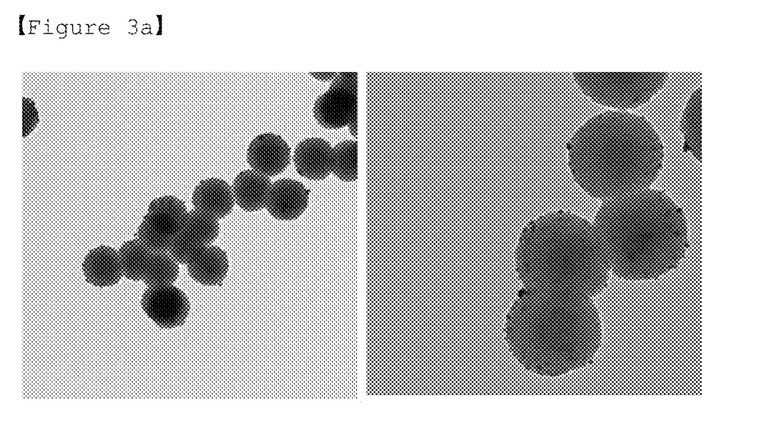
FIGS. 3a and 3b show TEM (transmission electron microscope) photographs of morphologies having Au particles introduced into polystyrene prepared in Comparative Preparation Example 1-1 and Comparative Preparation Example 1-2, respectively.
Figure 3B:
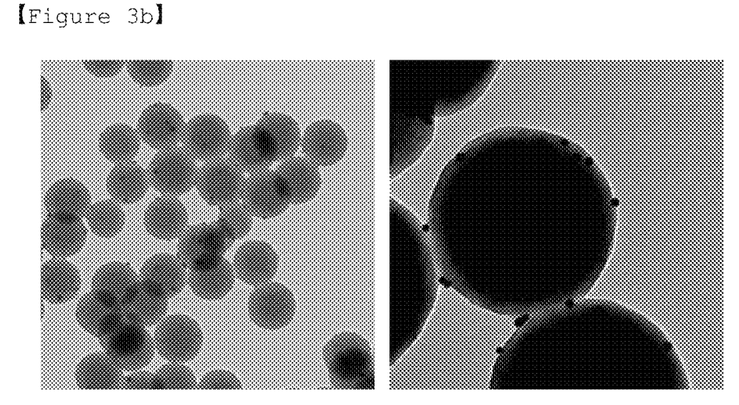

FIGS. 3a and 3b show TEM (transmission electron microscope) photographs of the morphologies having Au particles introduced into polystyrene prepared in Comparative Preparation Example 1-1 and Comparative Preparation Example 1-2, respectively.

FIG. 3a show a TEM (transmission electron microscope) photograph of polystyrenes prepared in Comparative Preparation Example 1-1, which have Au particles introduced therein, and it can be seen that many Au particles are formed on the surface of polystyrene particles.

On the contrary, FIG. 3b shows a TEM (transmission electron microscope) photograph of polystyrenes prepared in Comparative Preparation Example 1-2, which have Au particles introduced therein, and in the case of FIG. 3b, Au particles were formed after a longer reaction time than in FIG. 3a.

From this, it can be seen that the functional group of polystyrene plays an important role in the introduction of Au particles.

Experimental Example 3: Observation of the Surface of Polystyrene Particles Having the Introduced Au Particles, Which are Coated with the Carbon-Based Polymer, Depending on the Presence or Absence of Functional Groups of Polystyrene Particles Au particles were introduced into polystyrene with carboxyl group (—COOH) and amine group (—NH$_2$) prepared in Preparation Example 1-2 and polystyrene prepared in Comparative Preparation Example 1-2 in the same manner as in Experimental Example 2.

After dispersing 0.4 g of the above Au-introduced polystyrene particles into 300 ml of DI-water, 0.04 g of CTAB and 1.6 ml of NH$_4$OH were added and stirred for 30 minutes. 0.6 g of resorcinol and 0.84 ml of formaldehyde were added, and the mixture was stirred at room temperature for 16 hours and thus the Au-introduced polystyrene particles were coated with resorcinol. The morphology of resorcinol coated polystyrene particles thus obtained was observed.

Figure 4A:
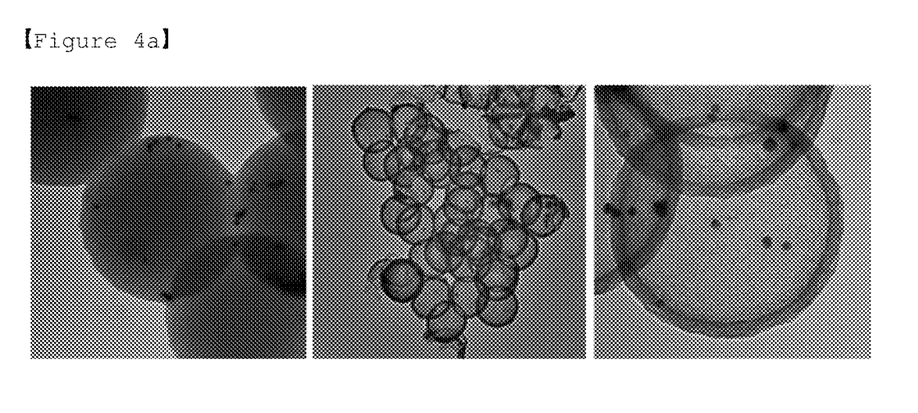
FIGS. 4a and 4b show TEM (transmission electron microscope) photographs of morphologies coated with resorcinol, which is a carbon-based polymer, after introducing Au into polystyrene prepared in Preparation Example 1-2 and Comparative Preparation Example 1-2, respectively.
Figure 4B:
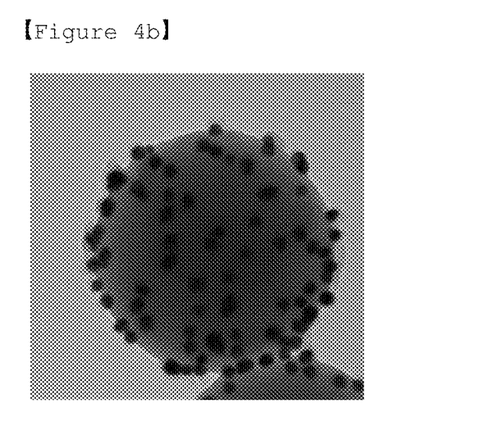

FIGS. 4a and 4b show TEM (transmission electron microscope) photographs of the morphologies coated with resorcinol, which is a carbon-based polymer, after introducing Au into polystyrene prepared in Preparation Example 1-2 and Comparative Preparation Example 1-2, respectively.

FIG. 4a shows a TEM photograph of the morphology coated with resorcinol after introducing Au into polystyrene prepared in Preparation Example 1-2, and from this, it was confirmed that resorcinol is uniformly coated to a thickness sufficient to cover all of the Au particles.

On the contrary, FIG. 4b shows a TEM photograph of the morphology coated with resorcinol after introducing Au into polystyrene prepared in Comparative Preparation Example 1-2, and from this, it can be seen that resorcinol does not react with the surface of the polystyrene, thereby making uniform coating difficult.

Experimental Example 4: Observation of the Size of Polystyrene Particles Depending on the Amount of Use of the Monomer for Introducing the Functional Group It was observed how the size of synthesized polystyrene particles was changed depending on the amount of use of the monomer for introducing the functional group.

Figure 5A:
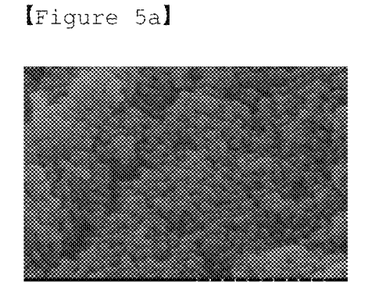
FIGS. 5a to 5c shows TEM (transmission electron microscope) photographs of the size of polystyrene particles prepared by using different amounts of monomer for introducing the functional group in Preparation Examples 2-1 to 2-3, respectively.
Figure 5B:
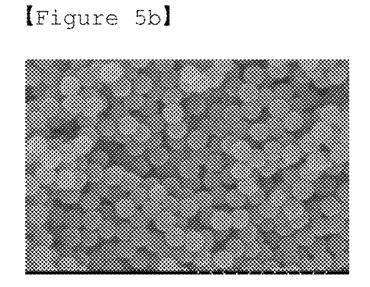
Figure 5C:
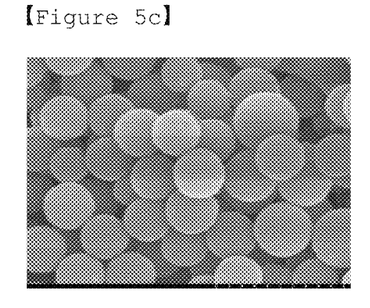

FIGS. 5a to 5c show TEM (transmission electron microscope) photographs showing the size of polystyrene particles prepared by using different amounts of monomer for introducing the functional group in Preparation Examples 2-1 to 2-3, respectively.

Referring to FIGS. 5a to 5c, it was confirmed that the size of the particles when using the monomer for introducing the functional group is decreased as compared with polystyrene particles synthesized without the monomer for introducing the functional group, and it can be seen that as the amount of monomer used is increased, the size of polystyrene particles is decreased.

Experimental Example 5: Observation of the Morphology of the Hollow Structure in Each Preparing Step The morphology of the result in each step when preparing the hollow structure according to Example 1 was observed.

Figure 6A:
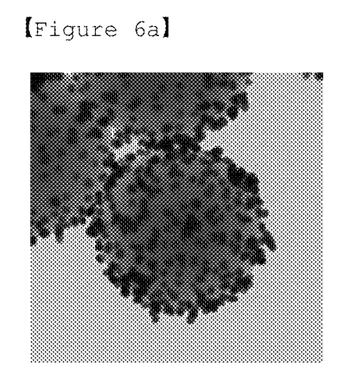
FIGS. 6a to 6c shows TEM (transmission electron microscope) photographs of the morphology of the result of each step of Example 1, respectively.
Figure 6B:
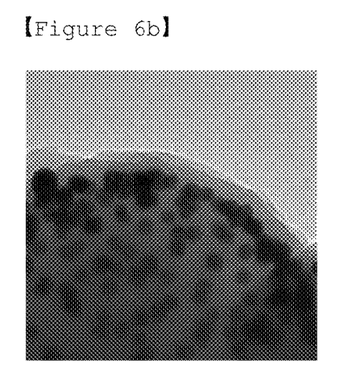
Figure 6C:
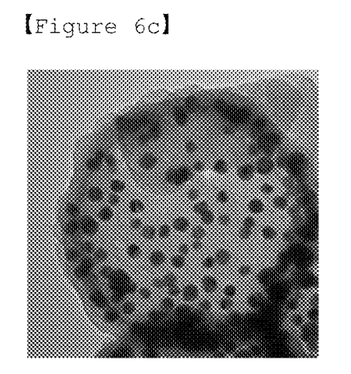

FIGS. 6a to 6c show TEM (transmission electron microscope) photographs of the morphology of the result of each step of Example 1, respectively.

FIG. 6a shows a photograph of the morphology of the polystyrene particles having a hydroxy group (—OH) and an amine group (—NH$_2$) introduced therein, into which Au particles were introduced, and from this, it can be seen that Au particles are well introduced onto the surface of polystyrene particles.

In addition, FIG. 6b shows a photograph of the morphology of the surface of the resorcinol-coated polystyrene particles into which Au particles were introduced, and from this, it can be seen that resorcinol is uniformly well coated.

In addition, FIG. 6c shows a photograph of the resorcinol-coated polystyrene particles after carbonization, and from this, it can be seen that polystyrene was completely removed and thus hollow was formed.

The invention claimed is:

1. A method of making a hollow structure comprising the steps of:
    (S1) preparing polystyrene having one or more functional group by a method comprising reacting a styrene monomer, a monomer for introducing the functional group and an initiator;
    (S2) adding the polystyrene of step (S1) to a metal solution to form polystyrene into which metal is introduced;
    (S3) coating the metal-introduced polystyrene with a carbon-based polymer;
    (S4) performing a first heat treatment on the metal-introduced polystyrene coated with the carbon-based polymer, to remove the polystyrene; and
    (S5) performing a second heat treatment on the result of step (S4) to carbonize the result of step (S4).

2. The method of making the hollow structure according to claim 1, wherein the functional group is at least one selected from the group consisting of a carboxyl group (—COOH), a hydroxyl group (—OH) and an amine group (—NH$_2$).

3. The method of making the hollow structure according to claim 1, wherein the monomer for introducing the functional group is at least one selected from the group consisting of acrylic acid, 2-hydroxyethyl acrylate, and allyl amine.

4. The method of making the hollow structure according to claim 1, wherein the initiator is at least one selected from the group consisting of 4,4'-azobis(4-cyanovaleric acid), 2,2'-azobis(2-methylpropionamidine) dihydrochloride and potassium persulfate.

5. The method of making the hollow structure according to claim 1, wherein in the polymerization of step (S1), 60 to 95% by weight of the styrene monomer; 1 to 30% by weight of the monomer for introducing the functional group; and 1 to 10% by weight of the initiator are reacted.

6. The method of making the hollow structure according to claim 1, wherein the metal solution is prepared by dissolving a metal precursor in a solvent, wherein the metal precursor has a concentration of 0.05 to 3 M.

7. The method of making the hollow structure according to claim 6, wherein the metal precursor is at least one selected from the group consisting of alkoxide containing metal, acetyl acetate containing metal, nitrate containing metal, oxalate containing metal, halide containing metal, and cyanide containing metal.

8. The method of making the hollow structure according to claim 7, wherein the metal is at least one selected from the group consisting of Au, Zn, Mg, Ag, Al, Pt, Si and Ca.

9. The method of making the hollow structure according to claim 6, wherein the solvent is at least one selected from the group consisting of ethanol, 1-propanol, iso-propanol, DI-water, NMP (methylpyrrolidone), DMF (dimethylformamide), DMAc (dimethylacetamide), DMSO (dimethyl sulfoxide) and THF (tetrahydrofuran).

10. The method of making the hollow structure according to claim 1, wherein the carbon-based polymer is at least one selected from the group consisting of resorcinol, polyacrylonitrile (PAN), polyaniline (PANI), polypyrrole (PPY), polyimide (PI), polybenzimidazole (PBI), polypyrrolidone (Ppy), polyamide (PA), polyamide-imide (PAI), polyaramide, melamine, melamine formaldehyde and fluorine mica.

11. The method of making the hollow structure according to claim 1, wherein a temperature for the first heat treatment is 450 to 600° C.

12. The method of making the hollow structure according to claim 1, wherein the first heat treatment is conducted under an inert atmosphere for 30 minutes to 3 hours.

13. The method of making the hollow structure according to claim 12, wherein the inert atmosphere comprises an inert gas selected from the group consisting of nitrogen, argon, helium, neon, krypton, xenon and radon.

14. The method of making the hollow structure according to claim 1, wherein a temperature for the second heat treatment is 900 to 1200° C.

* * * * *